US008270449B2

(12) United States Patent
Sakurai et al.

(10) Patent No.: US 8,270,449 B2
(45) Date of Patent: Sep. 18, 2012

(54) LIQUID SUPPLY DEVICES AND LIQUID CARTRIDGES

(75) Inventors: Hisaki Sakurai, Aichi-ken (JP); Tomohiro Kanbe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 321 days.

(21) Appl. No.: 12/823,790

(22) Filed: Jun. 25, 2010

(65) Prior Publication Data

US 2010/0328404 A1 Dec. 30, 2010

(30) Foreign Application Priority Data

Jun. 30, 2009 (JP) ................................ 2009-155810

(51) Int. Cl.
*H01S 3/091* (2006.01)

(52) U.S. Cl. ........................................... 372/76; 372/85

(58) Field of Classification Search .................... 347/76, 347/86
See application file for complete search history.

(56) References Cited

U.S. PATENT DOCUMENTS 7,008,034 B2 * 3/2006 Tsukada et al. ................... 347/7
7,264,342 B2 * 9/2007 Yamamoto et al. ............. 347/86
8,042,925 B2 * 10/2011 Sugahara et al. ............... 347/86
2001/0007463 A1 * 7/2001 Hayashi et al. ................. 347/86
2003/0020790 A1 * 1/2003 Kotaki et al. ................... 347/86
2005/0195225 A1 9/2005 Takagi et al.
2006/0001714 A1 * 1/2006 Usui et al. ....................... 347/86
2007/0188569 A1 * 8/2007 Amma et al. ................... 347/86

FOREIGN PATENT DOCUMENTS

JP 2005-246781 A 9/2005
JP 2006-027101 A 2/2006
JP 2008-221698 A 9/2008

* cited by examiner

*Primary Examiner* — Ellen Kim
(74) *Attorney, Agent, or Firm* — Baker Botts L.L.P.

(57) ABSTRACT

A liquid supply device includes a liquid cartridge, which has a liquid chamber that stores liquid, a cartridge mounting portion, and a surface detector. The liquid chamber has a first portion, a second portion, and a third portion. The liquid cartridge removably attaches to the cartridge mounting portion. The surface detector detects a surface of the liquid stored in the liquid chamber. A horizontal cross-sectional area of the first portion of the liquid chamber is less than each of a horizontal cross-sectional area of the second portion and the third portion of the liquid chamber, and the first portion of the liquid chamber is positioned between the second portion and the third portion of the liquid chamber in a direction orthogonal to the horizontal cross-sectional area of the first portion of the liquid chamber.

5 Claims, 10 Drawing Sheets

LIQUID SUPPLY DEVICES AND LIQUID CARTRIDGES

CROSS REFERENCE TO RELATED APPLICATION

The present application claims priority to and the benefit of Japanese Patent Application No. 2009-155810, which was filed on Jun. 30, 2009, the disclosure of which is incorporated herein by reference in its entirety.

BACKGROUND OF THE INVENTION

1. Field of the Invention

The present invention generally relates to liquid supply devices and liquid cartridges.

2. Description of Relate Art

A known ink cartridge, e.g., an ink cartridge described in JP-A-2008-221698, is configured to removably attach to an inkjet recording apparatus. The known ink cartridge has an ink chamber formed therein, and ink stored in the ink chamber is supplied to the inkjet recording apparatus when the ink cartridge is attached to the inkjet recording apparatus. A sensor arm is positioned in the ink chamber. When the ink surface in the ink chamber lowers as the amount of ink in the ink chamber decreases, a float portion provided at one end of the sensor arm moves downward with the lowering ink surface, such that the sensor arm pivots to move an indicator portion positioned at the other end of the sensor arm. Thus, when the amount of ink remaining in the ink chamber is greater than or equal to a predetermined amount, the indicator portion is positioned in a particular space provided in the ink chamber, and when the amount of ink is less than the predetermined amount, the indicator portion is positioned away from the particular space. By detecting the movement of the indicator portion with an optical sensor, e.g., a photo-interrupter, provided in the inkjet recording apparatus, it is possible to determine that the remaining amount of ink in the ink chamber has become less than the predetermined amount.

The position of the optical sensor may vary due to manufacturing errors or the like, and therefore the position at which the optical sensor detects the indicator portion for determining the remaining amount of ink in the ink chamber may vary. As a result, the level of ink at which the remaining amount of ink in the ink chamber is determined to be less than the predetermined amount may vary.

Due to the variation in the level of ink at which the remaining amount of ink is determined to be less than the predetermined amount, it may be determined that the remaining amount of ink has become less than the predetermined amount and the inkjet recording apparatus may instruct a user to replace the ink cartridge even though an amount of ink still remains. In another case, the remaining amount of ink may not be determined to be less than the predetermined amount and the inkjet recording apparatus may continue printing, even though only very little amount of ink remains, until ink is completely used up. This may deteriorate the print quality or the inkjet recording apparatus may fail to perform printing.

SUMMARY OF THE INVENTION

Therefore, a need has arisen for liquid supply devices and liquid cartridges which overcome these and other shortcomings of the related art. A technical advantage of the present invention is the improved accuracy in determining an amount of liquid stored in a liquid chamber.

According to an embodiment of the invention, a liquid supply device comprises a liquid cartridge comprising a liquid chamber configured to store liquid, the liquid chamber comprising a first portion, a second portion, and a third portion. The liquid supply device further comprises a cartridge mounting portion, wherein the liquid cartridge is configured to removably attach to the cartridge mounting portion, and a surface detector configured to detect whether a surface of the liquid stored in the liquid chamber is positioned below a reference position when the liquid cartridge is attached to the cartridge mounting portion. A horizontal cross-sectional area of the first portion of the liquid chamber is less than each of a horizontal cross-sectional area of the second portion of the liquid chamber and a horizontal cross-sectional area of the third portion of the liquid chamber, and the reference position is positioned in the first portion of the liquid chamber, and the first portion of the liquid chamber is positioned between the second portion and the third portion of the liquid chamber in a particular direction orthogonal to the horizontal cross-sectional area of the first portion of the liquid chamber.

According to another embodiment of the invention, a liquid chamber is configured to store liquid and comprises a first portion, a second portion, and a third portion. A horizontal cross-sectional area of the first portion of the liquid chamber is less than each of a horizontal cross-sectional area of the second portion of the liquid chamber and a horizontal cross-sectional area of the third portion of the liquid chamber. The first portion of the liquid chamber is positioned between the second portion and the third portion of the liquid chamber in a particular direction orthogonal to the horizontal cross-sectional area of the first portion of the liquid chamber. The liquid chamber further comprises a float positioned in the liquid chamber and configured to move at least in the first portion of the liquid chamber.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawing.

DETAILED DESCRIPTION OF EMBODIMENTS OF THE INVENTION

Embodiments of the present invention, and their features and advantages, may be understood by referring to FIGS. 1-10, like numerals being used for like corresponding parts in the various drawings.

Figure 1:
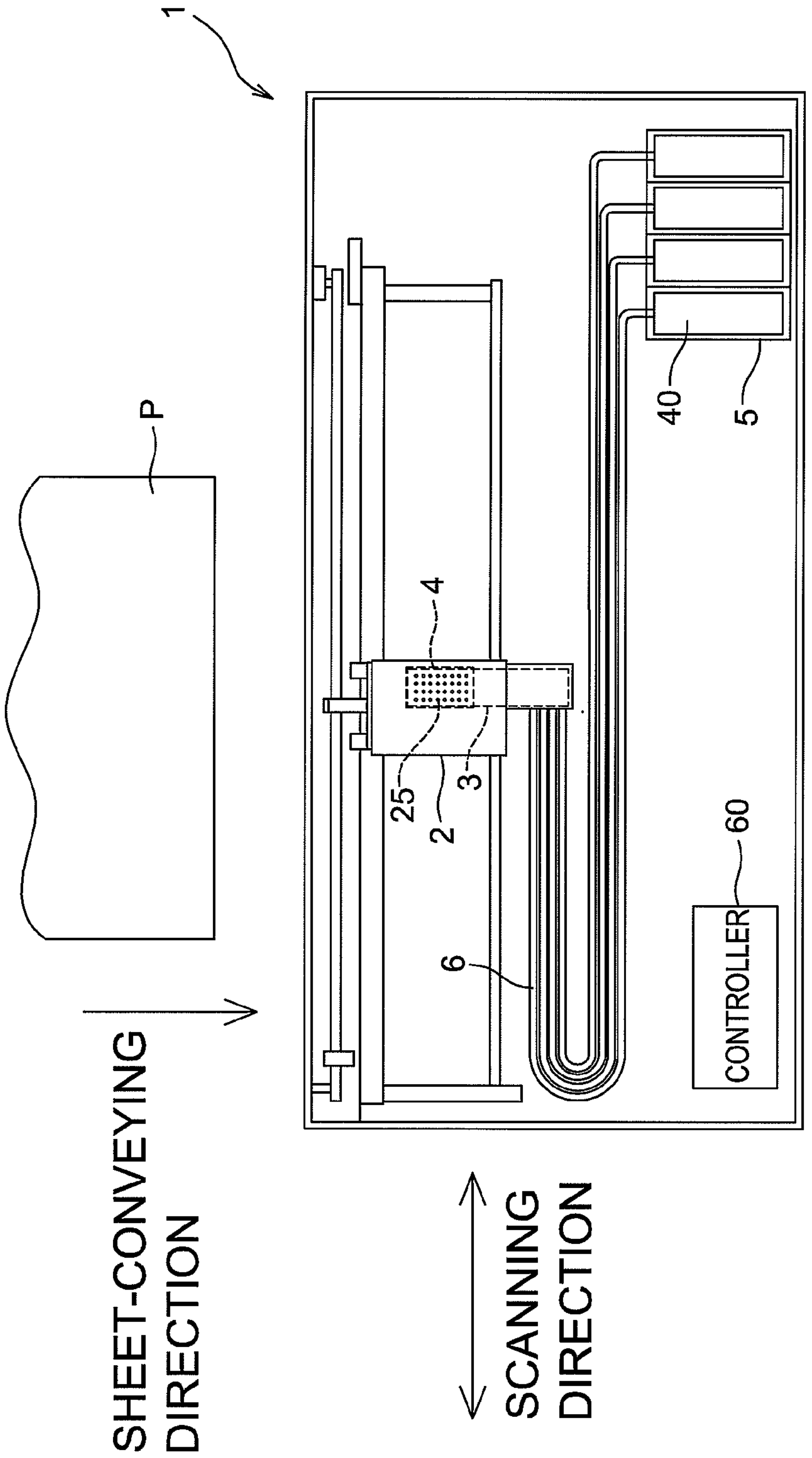
FIG. 1 is a plan view of a printer according to an embodiment of the invention.

Referring to FIG. 1, an inkjet recording apparatus, e.g., a printer 1, may comprise a carriage 2, a sub tank 3, an inkjet head 4, four cartridge mounting portions 5, four tubes 6, and a controller 60. The operation of the printer 1 may be controlled by controller 60.

Carriage 2 may be configured to reciprocate in a scanning direction, e.g., left-right direction in FIG. 1. Sub tank 3 may comprise a synthetic resin material, e.g., polyimide, and may be attached to carriage 2. Inkjet head 4 may be provided at a lower surface of sub tank 3. Inkjet head 4 may be configured to receive color inks, e.g., black, yellow, cyan, and magenta, from sub tank 3 and to discharge color inks from nozzles 25 formed in the lower surface thereof.

As shown in FIG. 1, four cartridge mounting portions 5 may be positioned at a substantially lower right end portion of printer 1. Four liquid cartridges, e.g., ink cartridges 40, which store black ink, yellow ink, cyan ink, and magenta, respectively, may removably attach to cartridge mounting portions 5.

Four cartridge mounting portions 5 may be in fluid communication with sub tank 3 via four tubes 6. Ink stored in ink cartridges 40, which attach to cartridge mounting portions 5, may be supplied to sub tank 3, and subsequently to inkjet head 4 through tubes 6. Four tubes 6 may comprise a synthetic resin material, e.g., polyimide, and may be configured to bend along with the movement of carriage 2.

Inkjet head 4 may reciprocate in printer 1 in the scanning direction with carriage 2 and may discharge ink onto a recording sheet P conveyed to a lower side of printer 1 by a sheet-conveying mechanism (not shown) in a sheet-conveying direction. Thus, printing on recording sheet P may be performed. Four cartridge mounting portions may have similar structures and ink cartridges 40 may have similar structures.

Figure 2A:
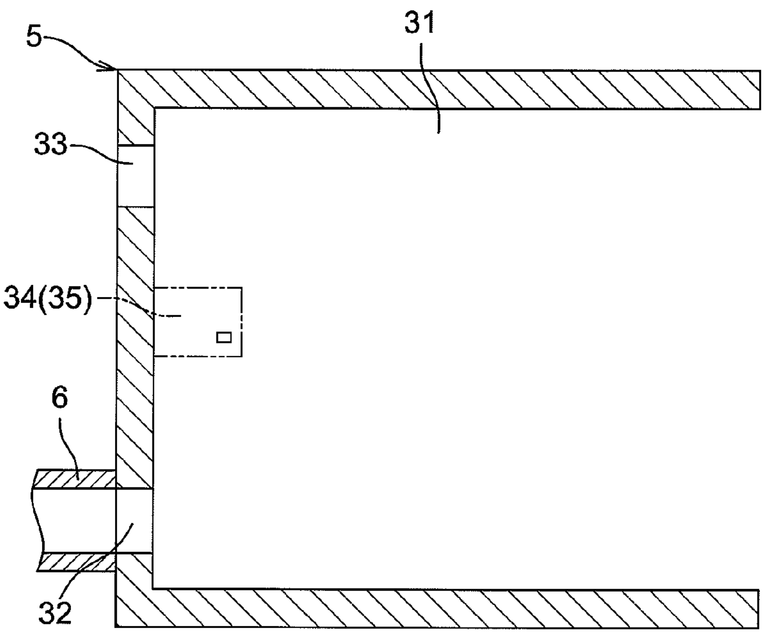
FIG. 2A is a vertical cross-sectional view of a cartridge mounting portion of the printer of FIG. 1

Referring to FIGS. 2A to 4, cartridge mounting portion 5 may comprise a mounting space 31, an ink supply path 32, and an air-communication path 33. Mounting space 31 may be open to the exterior of cartridge mounting portion 5 at a right-side end, as shown in FIG. 2A. Mounting space 31 may be configured to accommodate ink cartridge therein. Ink cartridge 40 may be inserted into mounting space 31 from the opening of cartridge mounting portion 5 and be attached to cartridge mounting portion 5. Ink cartridge 40 may detach from cartridge mounting portion 5, when ink cartridge 40 is pulled toward the right side via the opening, as shown in FIG. 2A.

Ink supply path 32 may be formed through a lower end portion of a wall defining the end of mounting space 31, e.g., the left side end in FIG. 2A, opposite the opening of cartridge mounting portion 5. Ink supply path 32 may extend in a direction along which ink cartridge 40 attaches to and detaches from cartridge mounting portion 5, e.g., the left-right direction in FIG. 2A. The right end of ink supply path 32 may communicate with mounting space 31 and the left end of ink supply path 32 may be connected to tube 6. Air-communication path 33 may be formed through an upper end portion of the wall defining the end of mounting space 31 opposite the opening of cartridge mounting portion 5. Air-communication path 33 may extend in the direction along which ink cartridge 40 attaches to and detaches from cartridge mounting portion 5, e.g., the left-right direction in FIG. 2A. The right end of the air-communication path 33 may communicate with mounting space 31 and the left end of air-communication path 33 may communicate with the atmosphere.

A light emitter 34 and a light receiver 35 may be provided on the wall of cartridge mounting portion 5 at the substantially central portion of the wall in the vertical direction, e.g., a top-bottom direction in FIG. 2A. Light emitter 34 and light receiver 35 may be positioned so as to oppose each other in the scanning direction, e.g., a horizontal direction. Light emitter 34 may emit light, e.g., visible light or infrared light. Light receiver 35 may receive light emitted from light emitter 34.

Ink cartridge 40 may comprise a translucent, e.g., transparent or semi-transparent, cartridge body 41 comprising a synthetic resin material, e.g., polyimide. Cartridge body 41 may have a substantially rectangular parallelepiped external shape. Cartridge body 41 may have openings formed at its side faces, respectively. Side faces may be opposed to each other in the scanning direction when ink cartridge 40 is attached to cartridge mounting portion 5. Ink cartridge 40 may comprise films 42 welded to the side faces of cartridge body 41 to cover the openings formed at the side faces, respectively. Ink cartridge 40 may comprise a liquid chamber, e.g., an ink chamber 43, an ink supply portion 44, an air-communication portion 45, a detection portion 46, a pivoting arm 47, and a partition wall 48.

Ink chamber 43 may be formed in ink cartridge 40 and may be configured to store ink. Cartridge body 41 may have a space that is open at the side faces thereof in the scanning direction. The openings at both side ends of cartridge body 41 may be covered by films 42 welded onto the side faces of cartridge body 41 in the scanning direction. Thus, ink chamber 43 may be formed by cartridge body 41 and films 42.

Figure 2B:
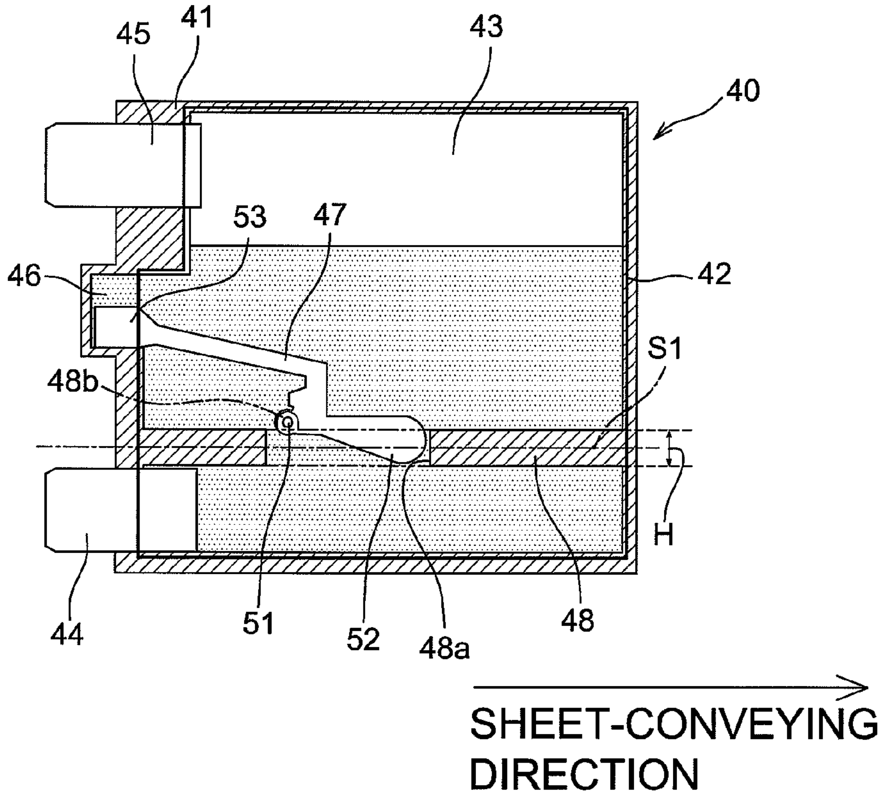
FIG. 2B is a vertical cross-sectional view of an ink cartridge configured to attach to the cartridge mounting portion, according to an embodiment of the invention.

As shown in FIG. 2B, ink supply portion 44 may be provided at the lower left end portion of cartridge body 41 and may communicate with ink chamber 43. Ink supply portion 44 may be configured to be connected to ink supply path 32 when ink cartridge 40 is attached to cartridge mounting portion 5. Ink supply portion 44 may comprise a valve (not shown) provided therein. This valve may be configured to open and allow ink chamber 43 to communicate with ink supply path 32 via ink supply portion 44 when ink cartridge 40 is attached to cartridge mounting portion 5. When ink cartridge 40 is attached to cartridge mounting portion 5 to allow ink chamber 43 to communicate with ink supply path 32, ink stored in ink chamber 43 may be supplied to sub tank 3 and subsequently to inkjet head 4 via ink supply portion 44, ink supply path 32, and tube 6.

Air-communication portion 45 may be provided at the upper left end portion of cartridge body 41, as shown in FIG. 2B, and may communicate with ink chamber 43. Air-communication portion 45 may be connected to air-communication path 33 when ink cartridge 40 is attached to cartridge mounting portion 5. Air-communication portion 45 may comprise a valve (not shown) provided therein. This valve may be configured to open and allow ink chamber 43 to communicate with air-communication path 33 via air-communication portion 45. When ink stored in ink chamber 43 is supplied to sub tank 3 and subsequently to inkjet head 4 and the remaining amount of ink in ink chamber 43 decreases, air may be introduced into ink chamber 43 via air-communication path 33 by an amount corresponding to the amount of ink supplied from ink chamber 43.

A detection portion 46 may communicate with a substantially central portion of the left end portion of ink chamber 43 in the vertical direction, e.g., top-bottom direction in FIG. 2B. Detection portion may project away from ink chamber, e.g., to the left in FIG. 2B. Detection portion 46 may have a width less than the width of ink chamber 43 in the scanning direction. When ink cartridge 40 is attached to cartridge mounting portion 5, detection portion 46 may be positioned between light emitter 34 and light receiver 35. Light emitted from light emitter 34 may pass through detection portion 46 and reach light receiver 35.

As shown in FIG. 2B, a pivoting arm 47 may be positioned in ink chamber 43 and may extend upward and leftward from the substantially central portion of ink chamber 43 in the left-right direction into detection portion 46. Pivoting arm 47 may be pivotally supported at an intermediate portion of pivoting arm 47, e.g., between one end and the other end of pivoting arm 47, by a shaft 51 extending in the scanning direction.

Pivoting arm 47 may comprise a float 52 provided at the right end of pivoting arm 47 and a light-blocking portion 53 at the left end of pivoting arm 47, as shown in FIG. 2B. Light-blocking portion 53 may be positioned in detection portion 46.

Figure 3A:
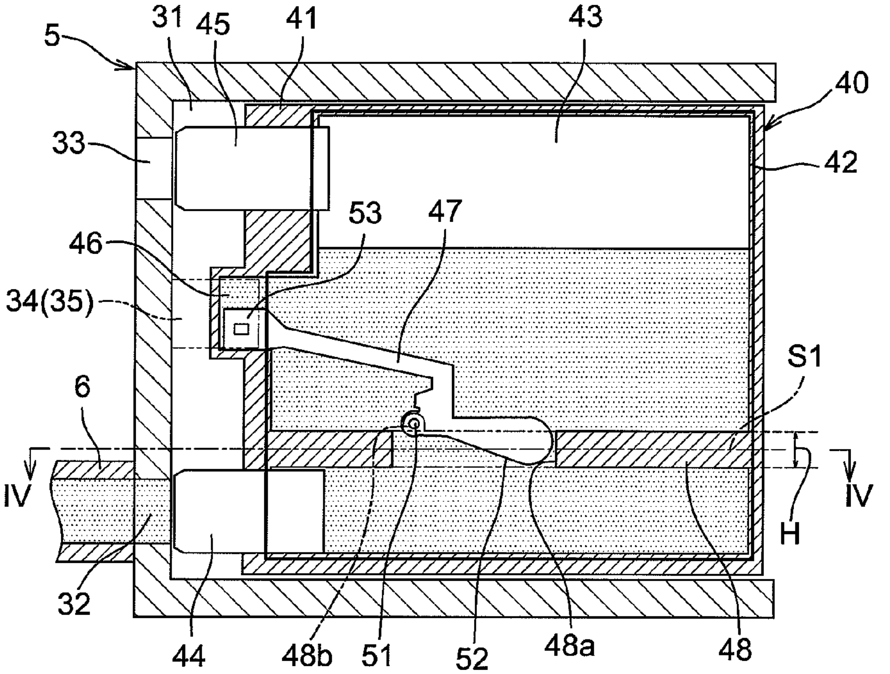
FIG. 3A is a vertical cross-sectional view of the ink cartridge of FIG. 2B attached to the cartridge mounting portion of FIG. 2A, in which an amount of ink stored in the ink cartridge is greater than or equal to a predetermined amount
Figure 3B:
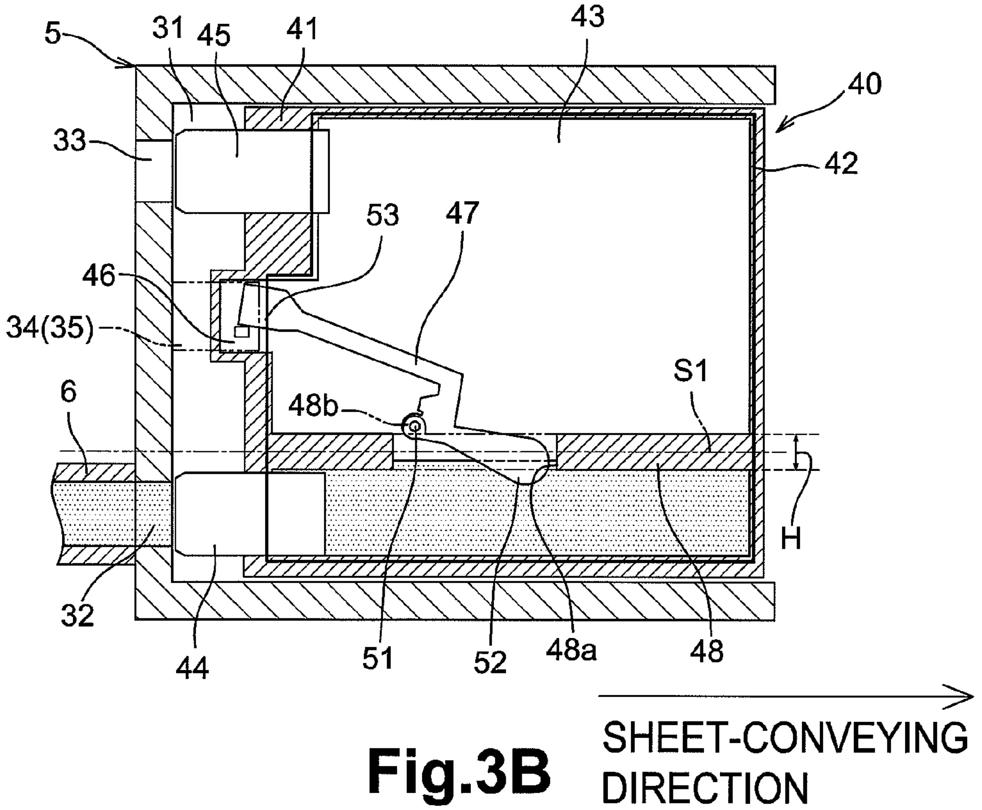
FIG. 3B is the ink cartridge of FIG. 3A, in which the amount of ink stored in the ink cartridge is less than the predetermined amount.
Figure 4:
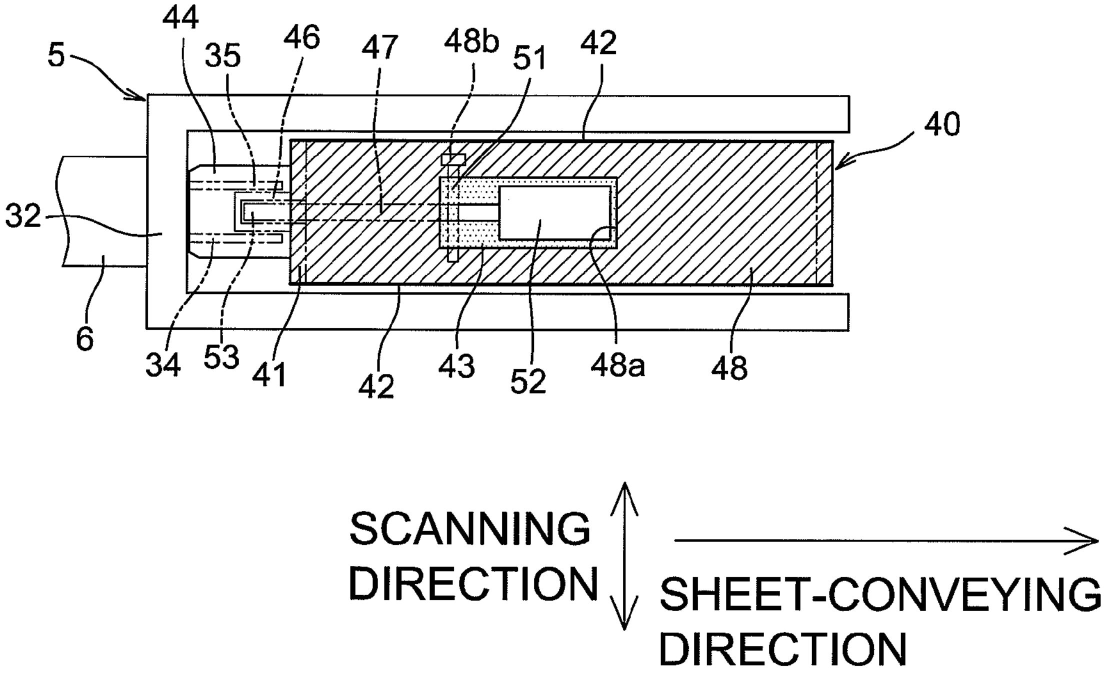
FIG. 4 is a cross-sectional view of the ink cartridge and the cartridge mounting portion taken along line IV-IV in FIG. 3A.

Pivoting arm 47 may be configured to pivot about shaft 51 between a position in which light-blocking portion 53 contacts the lower end of detection portion 46, as shown in FIG. 3A, and a position in which light-blocking portion 53 contacts the upper end of detection portion 46, as shown in FIG. 3B. When the amount of ink stored in the ink chamber 43 changes, float 52 may move based on the ink surface, such that pivoting arm 47 may pivot to move light-blocking portion 53 according to the movement float 52.

When ink cartridge 40 is attached to cartridge mounting portion 5 and the amount of ink stored in ink chamber 43 is greater than or equal to a predetermined amount, the ink surface in ink chamber 43 is positioned at or above a horizontal plane S1, which is positioned at a predetermined reference position, e.g., a predetermined reference height in FIG. 3A. When the ink surface in ink chamber 43 is level with the plane S1 or is positioned above plane S1, light-blocking portion 53 may be in a blocking position in which light-blocking portion 53 blocks the light emitted from light emitter 34, as shown in FIG. 3A.

On the other hand, when the amount of ink stored in ink chamber 43 becomes less than the predetermined amount and the ink surface in ink chamber 43 is positioned below plane S1, light-blocking portion 53 may be in a non-blocking position in which light-blocking portion 53 does not block the light emitted from light emitter 34, as shown in FIG. 3B.

By detecting whether or not light is received by the light receiver 35, it is possible to determine whether or not the amount of ink stored in the ink chamber 43 has become less than the predetermined amount.

As shown in FIGS. 3A and 3B, a partition wall 48 may extend in a horizontal direction and may have a vertical dimension H with a vertical center aligned with plane S1. Partition wall 48 may have a substantially rectangular through-hole 48*a* formed at a substantially central portion of partition wall 48 in a plan view. A first portion of ink chamber 43 may be formed in through-hole 48*a*. The first portion of ink chamber 43 may have a vertical dimension H with vertical center aligned with plane S1. A horizontal cross-sectional area of the first portion of ink chamber 43 may correspond to a horizontal cross-sectional area of through-hole 48*a* Ink chamber 43 may comprise a second portion positioned above partition wall 48 and a third portion positioned below partition wall 48. The horizontal cross-sectional area of the first portion of ink chamber 43, e.g., the horizontal cross-sectional area of the through-hole 48*a*, is less than each of a horizontal cross-sectional area of the second portion of ink chamber 43 and a horizontal cross-sectional area of the third portion of ink chamber 43.

Float 52 of pivoting arm 47 may be positioned in the first portion of ink chamber 43, e.g., in through-hole 48*a*. When pivoting arm 47 pivots, float 52 may move in the first portion of ink chamber 43, e.g., in through-hole 48*a*.

When pivoting arm 47 pivots about shaft 51 between a first position, as shown in FIG. 3A and a second position, as shown in FIG. 3B, float 52 may move in the vertical direction in a region including at least the first portion of ink chamber 43. When the ink surface in ink chamber 43 is positioned in the first portion of ink chamber 43, e.g., in through-hole 48*a*, float 52 may float on the ink surface. A shaft-supporting portion 48*b* configured to support shaft 51, which pivotally supports pivoting arm 47, may be provided on a top surface of partition wall 48.

Figure 5:
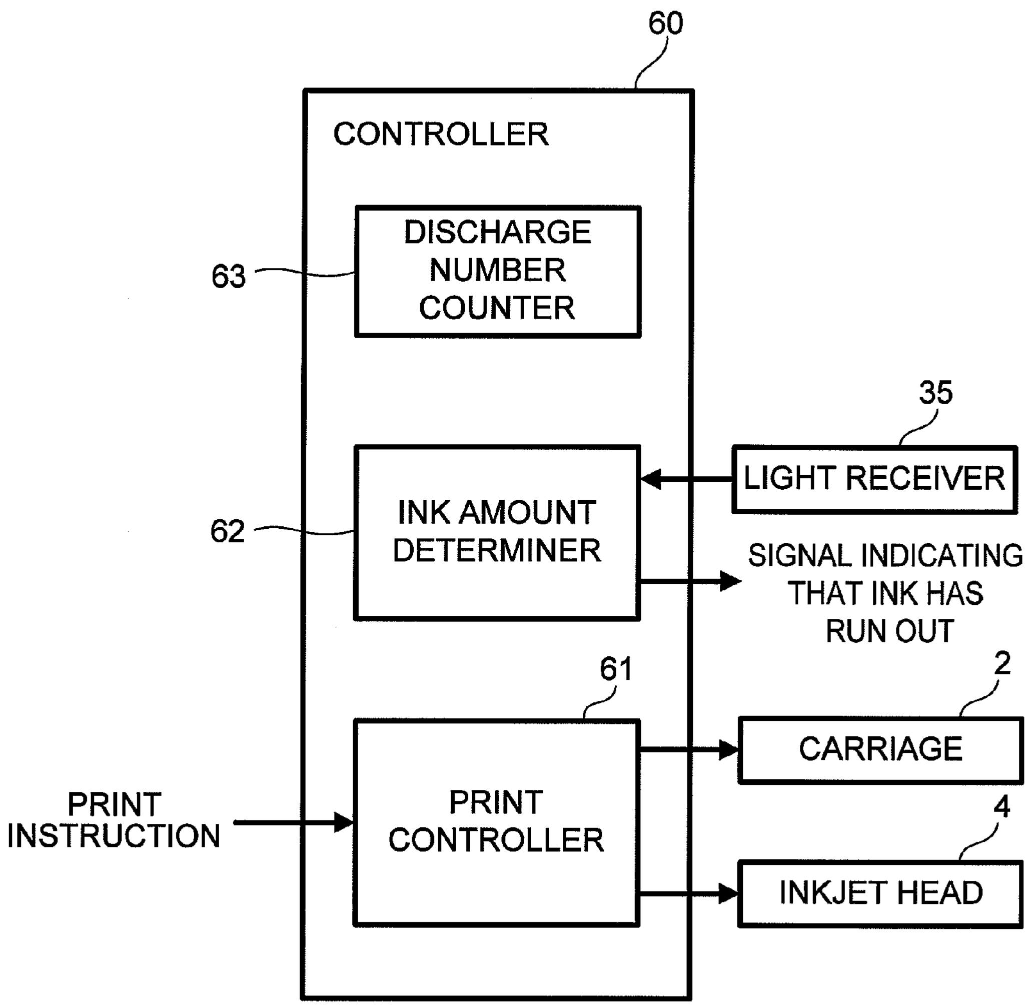
FIG. 5 is a functional block diagram of a controller of the printer of FIG. 1.

A controller 60 may comprise a CPU (Central Processing Unit), a ROM (Read Only Memory), a RAM (Random Access Memory), and etc. Referring to FIG. 5, controller 60 may be configured to function as a print controller 61, an ink amount determiner 62, and a discharge number counter 63.

When printer 1 receives a print instruction from an external PC to perform printing, controller 60 may function as print controller 61 and may be configured to control the operations of carriage 2, e.g., a driving motor (not shown) for moving carriage 2, and the operations of inkjet head 4, e.g., a driving device (not shown) of inkjet head 4.

Controller 60 may function as ink amount determiner 62 and may be configured to determine the amount of ink stored in ink chamber 43 based on whether the light emitted from light emitter 34 is received by light receiver 35 and based on a count number counted by a discharge number counter 63.

Light emitter 34 and light receiver 35 may be configured to detect whether light-blocking portion 53 is in the blocking position based on whether or not light receiver 35 receives the light emitted from light emitter 34. Light emitter 34 and light receiver 35 may detect whether the ink surface in ink chamber 43 is positioned below plane S1 because whether light-blocking portion 53 is in the blocking position corresponds to whether the ink surface in ink chamber 43 is positioned below plane S1. Light emitter 34 and light receiver 35 may detect whether the ink surface in ink chamber 43 is positioned below plane S1 by detecting the movement of float 52 because whether light-blocking portion 53 is in the blocking position depends on the position of float 52.

Controller 60 may function as discharge number counter 63 and may be configured to count the number of ink discharges from nozzles 25 after controller 60 determines that light emitter 34 and light receiver 35 detect that the ink surface in ink chamber 43 becomes lower than plane S1.

Figure 6:
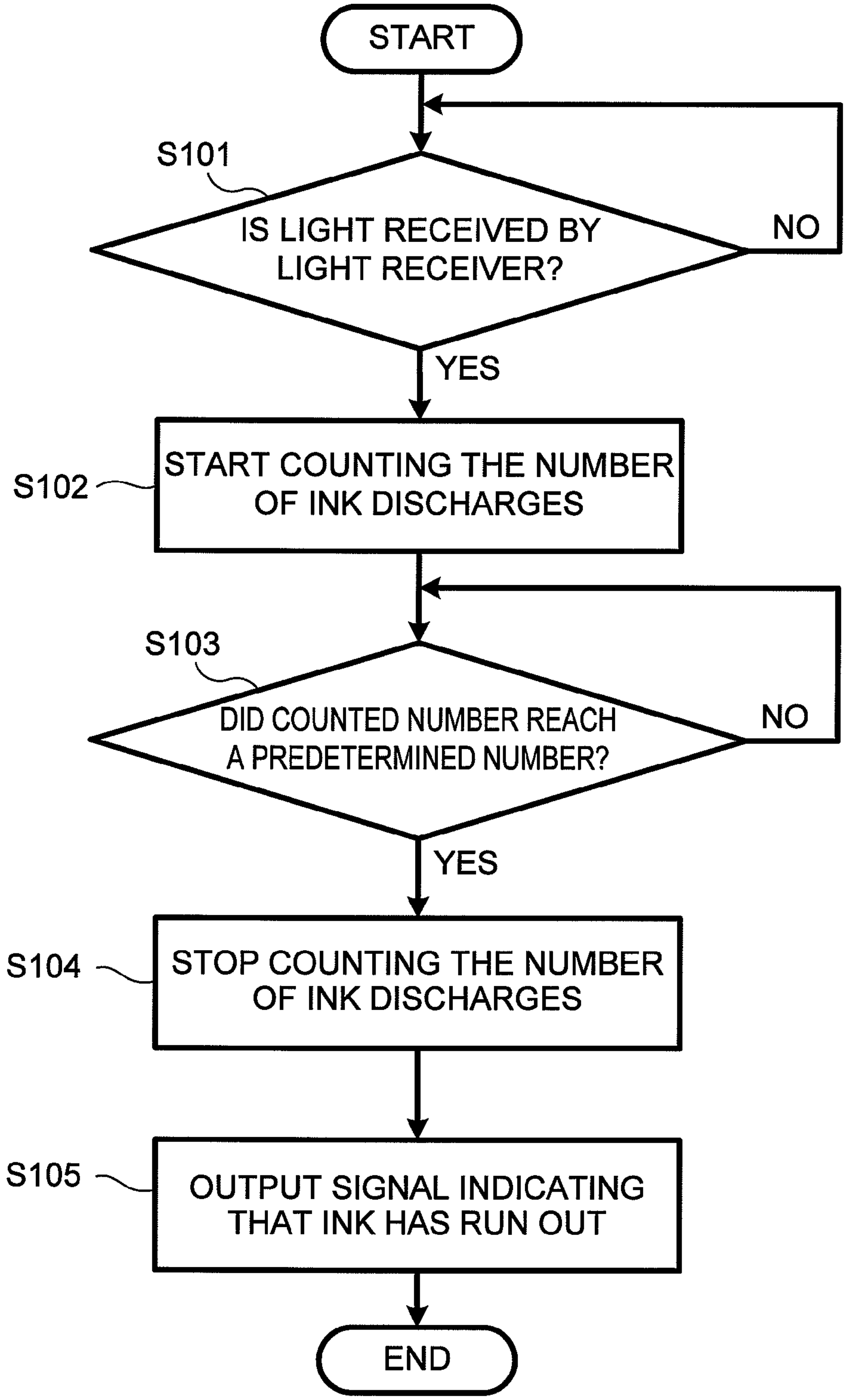
FIG. 6 is a flowchart of a process of determining an amount of ink stored in the ink cartridge.

When the amount of ink in ink chamber 43 of ink cartridge 40 attached to cartridge mounting portion 5 is greater than or equal to the predetermined amount, the ink surface is positioned above or at the same level as plane S1. In this situation, the light emitted from light emitter 34 may be blocked by light-blocking portion 53 and may not reach light receiver 35, and light receiver 35 may not receive the light. As shown in FIG. 6, step S101 may be repeated until light receiver 35 receives the light.

When the amount of ink in ink chamber 43 has become less than the predetermined amount and the ink surface in ink chamber 43 is positioned below plane S1, as shown in FIG. 3B, light-blocking portion 53 may move to the non-blocking position and may allow light receiver 35 to receive the light. When light receiver 35 receives the light, e.g., YES at Step S101 in FIG. 6, light receiver 35 may output a signal to controller 60. When controller 60 receives the signal from light receiver 35, controller 60 may function as discharge number counter 63 and may begin to count the number of ink discharges from nozzles 25, e.g., step S102 in FIG. 6.

Controller 60 may function as discharge number counter 63 and may count the number of ink discharges from nozzles 25 until the counted number reaches a predetermined number, e.g., No at step S103 in FIG. 6. When the counted number reaches the predetermined number, e.g., Yes at step S103, controller 60 may function as discharge number counter 63 and may stop counting the number of ink discharges, e.g., step S104, and may output a signal indicating that ink cartridge 40 has run out of ink to an external PC or the like connected to printer 1, e.g., Step S105. When the signal is output to the PC, a message or graphics suggesting replacement of ink cartridge 40 may appear on the display of the PC.

The predetermined number may be less than or equal to a value calculated by dividing the amount of ink remaining in ink chamber 43 when light receiver 35 initially receives the light by an amount of ink consumed in one ink discharge from nozzles 25. When the number counted by discharge number counter 63 reaches the predetermined number, the ink in the ink chamber 43 may almost have been completely consumed. The predetermined number may be stored in the ROM of controller 60. When the ink in ink chamber 43 almost has been completely consumed, controller 60 may be configured to output the signal indicating that ink cartridge 40 has run out of ink before a subsequent printing is performed.

The actual height of the ink surface when light receiver 35 initially receives the light in step S101 may vary due to manufacturing errors or the like. Accordingly, the amount of ink in ink chamber 43 when light receiver 35 initially receives the light, e.g., when it is detected that the ink surface in ink chamber 43 is below plane S1, also may vary.

If the height of the ink surface when light receiver 35 initially receives the light increases due to the variation in height of the ink surface, the remaining amount of ink at which light receiver 35 receives the light may increase. Accordingly, even after the ink has been discharged the predetermined number of times, a sufficient amount of ink still may remain in ink chamber 43. However, because the signal indicating that ink cartridge 40 has run out of ink is enabled, ink cartridge 40 may be replaced even though the amount of ink for printing may still remain in ink chamber 43.

If the height of the ink surface when light receiver 35 initially receives the light decreases due to the variation in height of the ink surface, the remaining amount of ink at which light receiver 35 initially receives the light may decrease. Accordingly, ink in ink chamber 43 may be completely consumed before ink is discharged the predetermined number of times. However, printing may continue even after the ink in ink chamber 43 is completely consumed and ink discharge failure may occur in nozzles 25. This may result in deterioration in the print quality or printer 1 may fail to perform printing.

The variation in the remaining amount of ink at which light receiver 35 initially receives the light may be calculated by multiplying the variation in height of the ink surface by the horizontal cross-sectional area of ink chamber 43. Accordingly, the larger the horizontal cross-sectional area of ink chamber 43, the larger the variation in the remaining amount of ink due to the variation in height of the ink surface may be.

According to an embodiment of the invention, the first portion of ink chamber 43 may have vertical dimension H with vertical center aligned with plane S1, which has a horizontal cross-sectional area less than each of the horizontal cross-sectional area of the second portion of ink chamber 43 and the horizontal cross-sectional area of the third portion of ink chamber 43. Therefore, when light receiver 35 initially receives the light, the ink surface in ink chamber 43 is positioned at the portion where ink chamber 43 has a reduced horizontal cross-sectional area. Therefore, even if the height of the liquid surface varies, the variation in the remaining amount of ink may be reduced. Accordingly, the accuracy in determining the remaining amount of ink in ink chamber 43 may be improved.

Ink chamber 43 may have a reduced horizontal cross-sectional area at the first portion of ink chamber 43 defined by partition wall 48, but not at the second and third portions of the ink chamber 43 sandwiching the first portion from the top and bottom. Therefore, the capacity of ink chamber 43 as a whole may be substantially maintained although ink chamber 43 has the first portion with the reduced horizontal cross-sectional area.

In an embodiment of the invention, light emitter 34 and light receiver 35 may be configured to indirectly detect the position of float 52 by the movement of pivoting arm 47 and light-blocking portion 53. In another embodiment of the invention, float 52 may be configured to block the light emitted from light emitter 34 and light emitter 34 and light receiver 35 may be configured to directly detect the position of float 52.

Figure 7:
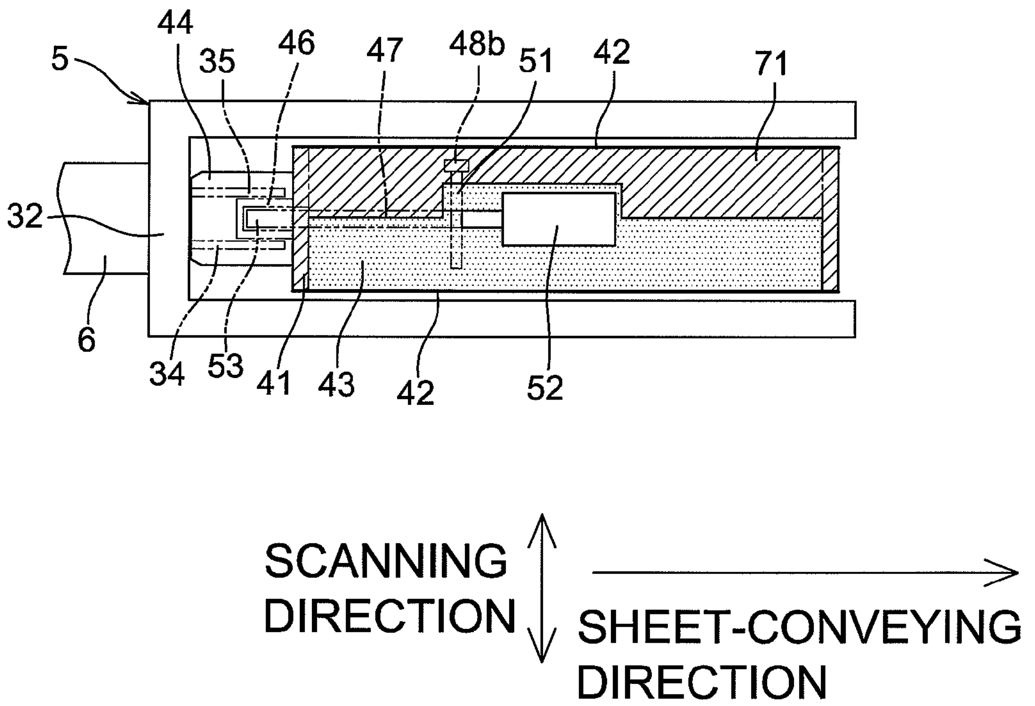
FIG. 7 is a cross-sectional view of an ink cartridge and a cartridge mounting portion, corresponding to FIG. 4, according to another embodiment.

Referring to FIG. 7, a partition wall 71, according to another embodiment of the invention, may comprise a wall corresponding to substantially half of partition wall 48 in the scanning direction. The first portion of ink chamber 43 may comprise a portion of ink chamber 43, which overlaps partition wall 71 horizontally and does not overlap partition wall 71 in a plan view, as shown in FIG. 7. The first portion of ink chamber 43 may have a vertical dimension H with vertical center aligned with a plane S1. Ink chamber 43 may comprise a second portion positioned above partition wall 71 and a third portion positioned below partition wall 71.

A horizontal cross-sectional area of the first portion of ink chamber 43 may be less than each of a horizontal cross-sectional area of the second portion of ink chamber 43 and a horizontal cross-sectional area of the third portion of ink chamber 43. The ink surface in ink chamber 43 when light receiver 35 initially receives the light may be positioned at the portion where ink chamber 43 has a reduced horizontal cross-sectional area. Accordingly, even if the height of the ink surface varies, the variation in the remaining amount of ink in ink chamber 43 may be reduced.

Figure 8:
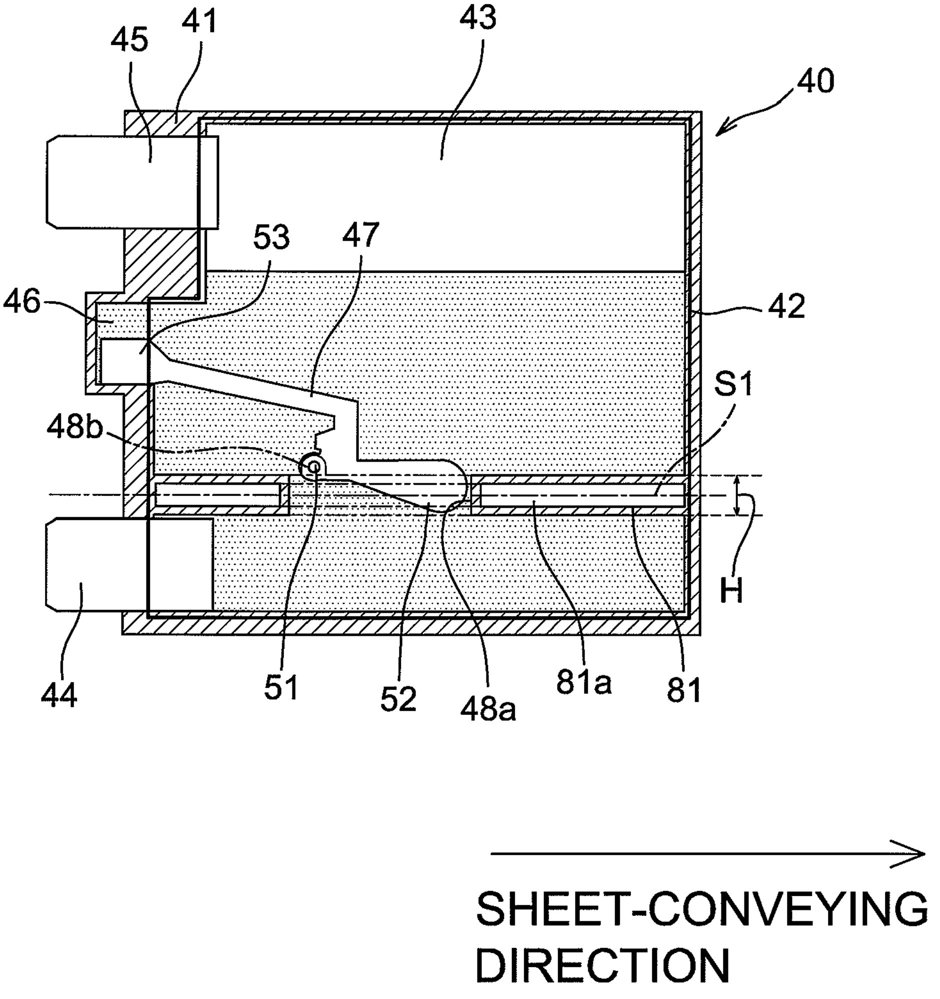
FIG. 8 is a vertical cross-sectional view of an ink cartridge according to yet another embodiment of the invention.

Referring to FIG. 8, a partition wall 81, according to yet another embodiment of the invention, may have a cavity 81*a* formed therein. Even if the height of the ink surface of ink in ink chamber 43 at which light receiver 35 initially receives the light varies, the variation in the remaining amount of ink in ink chamber 43 may be reduced.

Cavity 81*a* inside partition wall 81 may be formed so as to open to the exterior of ink cartridge 40. Cavity 81*a* may function as, for example, a guiding groove for guiding ink cartridge 40 during the insertion of ink cartridge 40 into cartridge mounting portion 5.

Figure 9A:
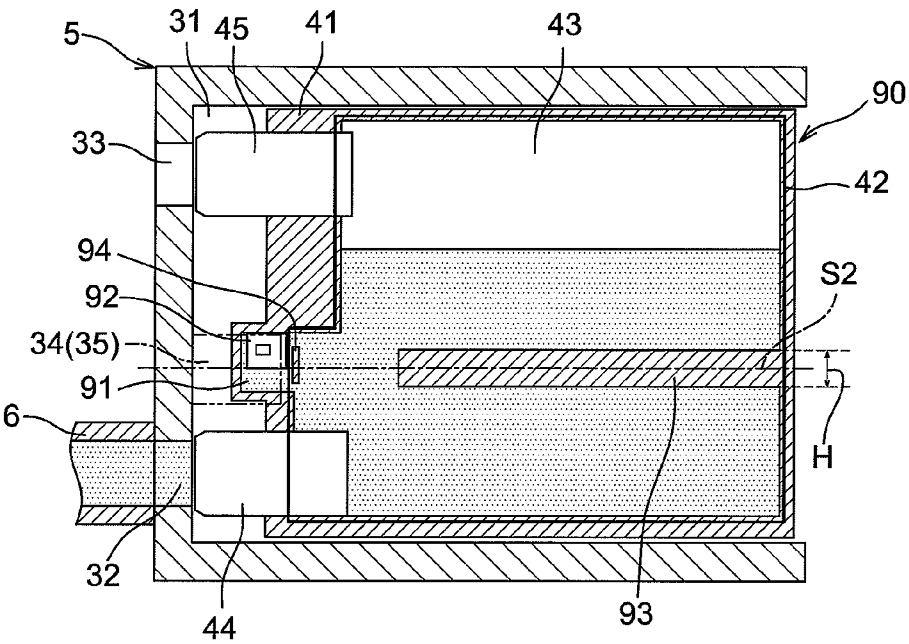
FIG. 9A is a vertical cross-sectional view of an ink cartridge attached to a cartridge mounting portion according to still another embodiment of the invention, in which an amount of ink stored in the ink cartridge is greater than or equal to a predetermined amount
Figure 9B:
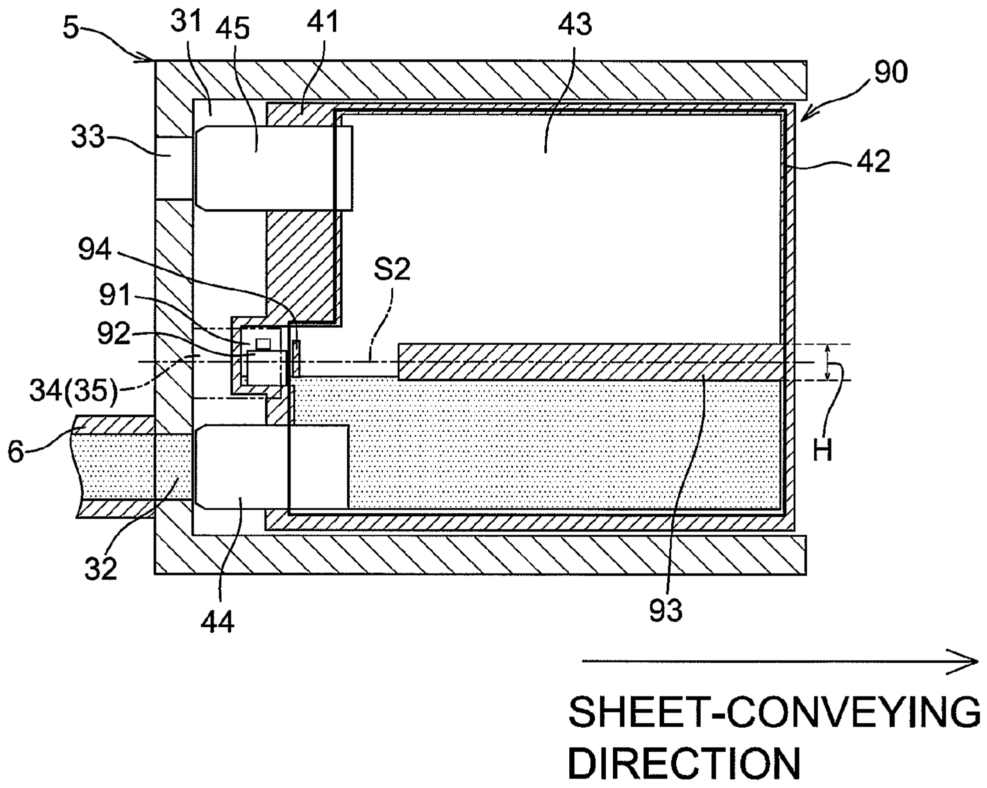
FIG. 9B is a vertical cross-sectional views of the ink cartridge and the ink cartridge mounting portion of FIG. 9A, in which the amount of ink stored in the ink cartridge is less than the predetermined amount.

Referring to FIGS. 9A and 9B, an ink cartridge 90, according to still another embodiment of the invention, may comprise a detection portion 91. Detection portion 91 may have a width greater than a width of detection portion 46 in the scanning direction, and may be positioned lower than detection portion 46. Ink cartridge 90 may comprise a float 92 configured to block light. Float 92 may be positioned in detection portion 91. When the ink surface in ink chamber 43 moves, float 92 may move up and down in detection portion 91, based on the movement of the ink surface.

Ink cartridge 90 may comprise a partition wall 93 positioned in ink chamber 43 and extending from the right side wall of cartridge body 41 toward the left side, as shown in FIGS. 9A and 9B. Partition wall 93 may horizontally overlap the substantially lower half of detection portion 91. Partition wall 93 may have a vertical dimension H with vertical center aligned with a plane S2, which is positioned at a predetermined reference position, e.g., a predetermined reference height as shown in FIGS. 9A and 9B. Ink chamber 43 may comprise a first portion which overlaps partition wall 93 horizontally and does not overlap partition wall 93 in a plan view. The first portion of ink chamber 43 may have a vertical dimension H with vertical center aligned with plane S2. Ink chamber 43 may comprise a second portion positioned above partition wall 93 and a third portion positioned below partition wall 93. A horizontal cross-sectional area of the first portion of ink chamber 43 may be less than each of a horizontal cross-sectional area of the second portion of ink chamber 43 and a horizontal cross-sectional area of the third portion of ink chamber 43. Accordingly, even if the height of the ink surface in ink chamber 43 at which light receiver 35 initially receives the light varies, the variation in the remaining amount of ink in ink chamber 43 may be reduced.

Float 92 may be configured to move in the vertical direction in a region including at least the first portion of ink chamber 43. When the ink surface in ink chamber 43 is positioned in the first portion of the ink chamber 43, float 92 may float on the ink surface. Ink cartridge 90 may comprise a stopper 94 positioned to the right of detection portion 91, as shown in FIGS. 9A and 9B. Stopper 94 may prevent float 92 from moving away from detection portion 91.

When the ink surface in ink chamber 43 is positioned at a level above or at plane S2, as shown in FIG. 9A, float 92 may be positioned in a blocking position in which float 92 blocks the light emitted from light emitter 34. On the other hand, when the ink surface in ink chamber 43 is positioned at a level below plane S2, as shown in FIG. 9B, float 92 may be positioned in a non-blocking position in which float 92 does not block the light emitted from light emitter 34.

Detection portion 91, light emitter 34, and light receiver 35 may be positioned at substantially the same height as plane S2. Plane S2 may be positioned higher than plane S1 of the above-described embodiments to prevent light emitter 34, light receiver 35, and detection portion 91 from interfering with ink supply path 32 and ink supply portion 44.

Because float 92 is positioned in detection portion 91, detection portion 91 may have a greater width in the scanning direction than detection portion 46 of the above-described embodiments. A distance between light emitter 34 and light receiver 35 in the scanning direction may be greater than a distance between light emitter 34 and light receiver 35 described in the above-described embodiments.

In yet another embodiment of the invention, ink may have light absorbing property and light emitter 34 and light receiver 35 may detect the position of the ink surface by detecting the presence of the ink directly. In still another embodiment of the invention, a vertical dimension of a partition wall may be greater than dimension H and the partition wall may overlap plane S1 or S2.

Figure 10:
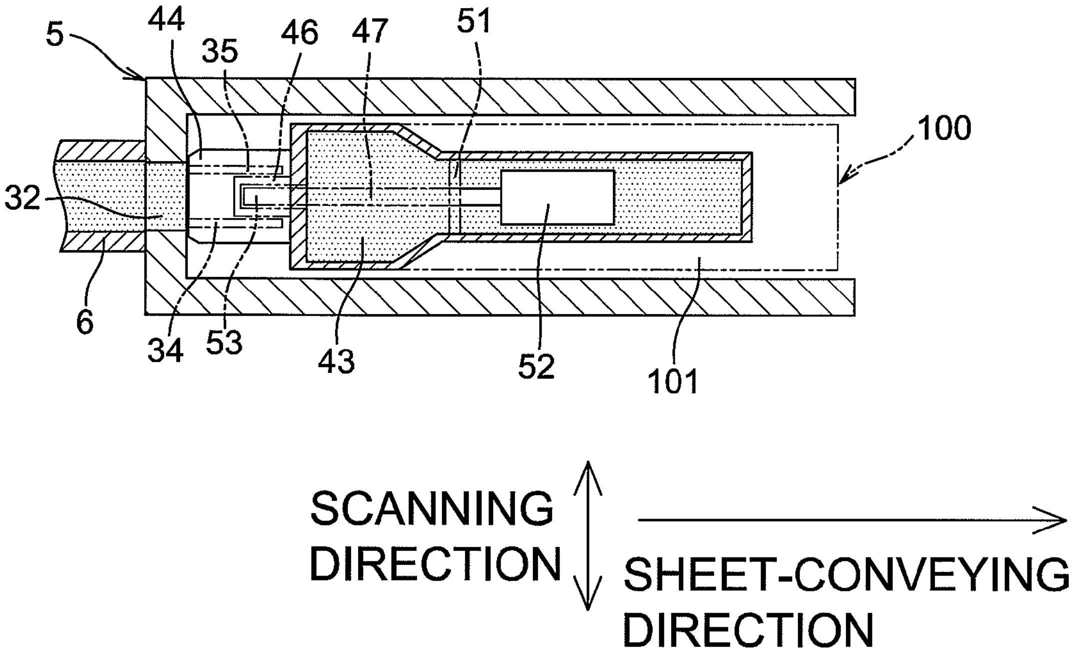
FIG. 10 is a cross-sectional view of an ink cartridge and a cartridge mounting portion according to still another embodiment of the invention.

In still another embodiment of the invention, an ink cartridge may not have a partition wall. Referring to FIG. 10, an ink cartridge 100 may comprise an ink chamber 43 defined by a cartridge body 101 of ink cartridge 100. Cartridge body 101 may have a shape in which portions of the side walls thereof in the scanning direction and a portion of the right wall thereof are recessed into ink chamber 43 from the other portions of the side walls and the right wall thereof, as shown in FIG. 10. The recessed portions may be positioned at substantially the same height as partition wall 48 of the above-described embodiment. A shaft 51 may extend from one of the side walls to the other of the side walls of cartridge body 101 in the scanning direction.

Ink chamber 43 may comprise a first portion defined by the recessed portion of the side walls and the right wall of the cartridge body 101. The first portion may have a horizontal cross-sectional area less than a second portion and a third portion of the ink chamber 43 positioned above and below the recessed portion, respectively. Even if the height of the ink surface in ink chamber 43 at which light receiver 35 initially receives the light varies, the variation in the remaining amount of ink in ink chamber 43 may be reduced.

In yet another embodiment, the present invention may be applied to a liquid supply device for supplying liquid to a device other than the inkjet head and to a liquid cartridge used in such a liquid supply device.

While the invention has been described in connection with various example structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. A liquid supply device comprising:

a liquid cartridge comprising a liquid chamber configured to store liquid, the liquid chamber comprising a first portion, a second portion, and a third portion;

a cartridge mounting portion, wherein the liquid cartridge is configured to removably attach to the cartridge mounting portion; and a surface detector configured to detect whether a surface of the liquid stored in the liquid chamber is positioned below a reference position when the liquid cartridge is attached to the cartridge mounting portion, wherein a horizontal cross-sectional area of the first portion of the liquid chamber is less than each of a horizontal cross-sectional area of the second portion of the liquid chamber and a horizontal cross-sectional area of the third portion of the liquid chamber, and wherein the reference position is positioned in the first portion of the liquid chamber, and the first portion of the liquid chamber is positioned between the second portion and the third portion of the liquid chamber in a particular direction orthogonal to the horizontal cross-sectional area of the first portion of the liquid chamber.

2. The liquid supply device of claim 1, wherein the liquid cartridge further comprises a float positioned in the liquid chamber and configured to move at least in the first portion of the liquid chamber along the particular direction, and wherein the surface detector is configured to detect whether the surface of liquid is positioned below the reference position based on the movement of the float.

3. The liquid supply device of claim 2, wherein the surface detector comprises a light emitter configured to emit light and a light receiver configured to receive the light emitted from the light emitter, wherein the liquid cartridge further comprises a pivoting arm positioned in the liquid chamber, wherein the float is positioned at a first end of the pivoting arm and a light-blocking portion configured to block light is positioned at a second end of the pivoting arm, and the pivoting arm is pivotally supported at a position between the first end and the second end of the pivoting arm, wherein the pivoting arm is configured to pivot based on the movement of the float, such that the light-blocking portion selectively moves between a blocking position in which the light-blocking portion blocks the light emitted from the light emitter and a non-blocking position in which the light-blocking portion does not block the light emitted from the light emitter, and wherein the surface detector is configured to detect whether the surface of liquid is positioned below the reference position based on whether the light receiver receives the light emitted from the light emitter.

4. A liquid cartridge comprising:

a liquid chamber configured to store liquid, the liquid chamber comprising a first portion, a second portion, and a third portion, wherein a horizontal cross-sectional area of the first portion of the liquid chamber is less than each of a horizontal cross-sectional area of the second portion of the liquid chamber and a horizontal cross-sectional area of the third portion of the liquid chamber, wherein the first portion of the liquid chamber is positioned between the second portion and the third portion of the liquid chamber in a particular direction orthogonal to the horizontal cross-sectional area of the first portion of the liquid chamber; and a float positioned in the liquid chamber and configured to move at least in the first portion of the liquid chamber.

5. The liquid cartridge of claim 4, further comprising a pivoting arm positioned in the liquid chamber, wherein the float is positioned at a first end of the pivoting arm and a light-blocking portion configured to block light is positioned at a second end of the pivoting arm, and the pivoting arm is pivotally supported at a position between the first end and the second end of the pivoting arm, wherein the pivoting arm is configured to pivot such that the light-blocking portion moves based on a movement of the float.

* * * * *